United States Patent
Sombroek et al.

(10) Patent No.: US 7,193,610 B2
(45) Date of Patent: Mar. 20, 2007

(54) SYSTEM FOR SPEED ADAPTIVE POSITIONING OF A CURSOR RESPONSIVE TO A PREDETERMINED TIME INTERVAL AFTER AN INITIAL APPLICATION OF FORCE WITHIN A USER INTERFACE

(75) Inventors: Renate M. Sombroek, Delft (NL); Jan D. Gerlings, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 499 days.

(21) Appl. No.: 08/704,400

(22) Filed: Aug. 27, 1996

(65) Prior Publication Data

US 2003/0080970 A1 May 1, 2003

Related U.S. Application Data

(63) Continuation of application No. 08/255,277, filed on Jun. 8, 1994, now abandoned.

(30) Foreign Application Priority Data

Jun. 14, 1993 (EP) .................................. 93201701

(51) Int. Cl.
  *G09G 5/08* (2006.01)
  *G06F 3/033* (2006.01)
(52) U.S. Cl. ..................................................... 345/159
(58) Field of Classification Search .............. 345/159; 273/438; 463/36–39
  See application file for complete search history.

(56) References Cited

U.S. PATENT DOCUMENTS

| | | | |
|---|---|---|---|
| 4,209,842 A | 6/1980 | Knowlton | ..................... 364/718 |
| 5,012,231 A * | 4/1991 | Felsenstein | .................. 345/159 |
| 5,153,571 A * | 10/1992 | Takahashi | ..................... 345/159 |
| 5,376,946 A * | 12/1994 | Mikan | ......................... 345/159 |

FOREIGN PATENT DOCUMENTS

| | | | |
|---|---|---|---|
| EP | 0062133 | 10/1982 | |
| JP | 174729 | 10/1982 | |
| JP | 1-200285 | * 8/1989 | .................. 345/159 |

OTHER PUBLICATIONS

"Cursor Movement Control Circuitry", IBM Technical Disclosure Bulletin, vol. 21, No. 3, Aug. 1978, pp. 1184-1186.
"Increasing Spatial Method for Accelerating Keystroke Action", IBM Techincal Disclosure Bulletin, vol. 26, No. 2, Jul. 1983, pp. 467-476.
"Smooth Travel of Crosshair Cursor on Display Screen", IBM Technical Disclosure Bulletin, vol. 26, No. 2, Jul. 1983, pp. 473-476.

* cited by examiner

*Primary Examiner*—Jeffery A. Brier

(57) ABSTRACT

A data processing system having a display; a cursor control connected to the display for displacement of a cursor represented on the display; and a user-interface coupled to the cursor control for user-manipulation of the cursor via the cursor control. The cursor control is operative to displace the cursor at a relatively low speed relative to the display during a predetermined time interval upon activation of the user-interface and to displace the cursor at a relatively high speed after the predetermined time interval has elapsed. The speeds may be at fixed respective values, v1 and v2. Alternatively, v1 and v2 may be the upper bounds of speed ranges, the cursor speed being continuously variable through the user-interface.

10 Claims, 3 Drawing Sheets

Figure 1:
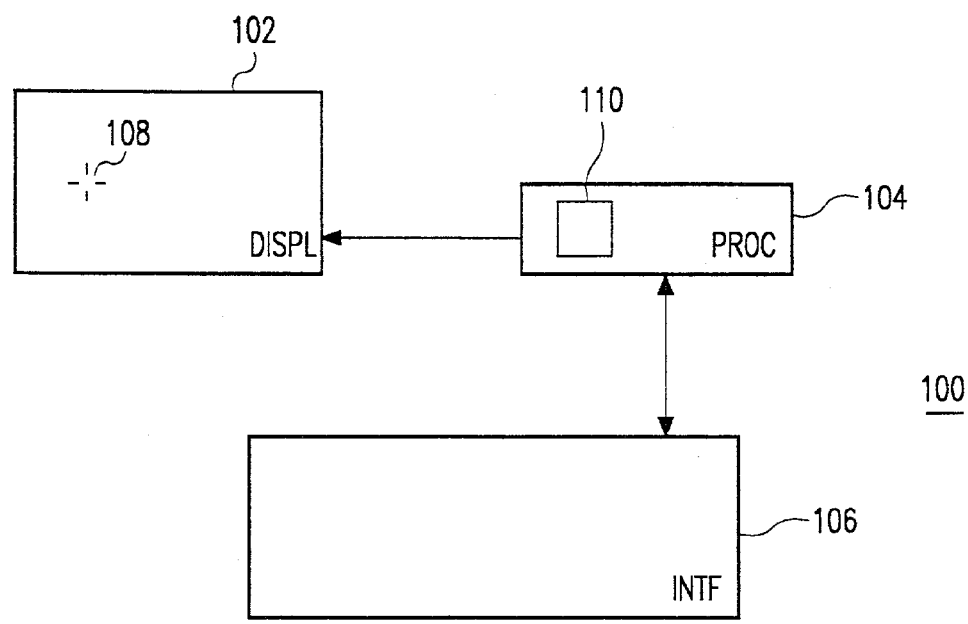

SYSTEM FOR SPEED ADAPTIVE POSITIONING OF A CURSOR RESPONSIVE TO A PREDETERMINED TIME INTERVAL AFTER AN INITIAL APPLICATION OF FORCE WITHIN A USER INTERFACE

This is a continuation of application Ser. No. 08/255,277, filed Jun. 8, 1994 now abandoned.

FIELD OF THE INVENTION

The invention relates to a data processing system comprising a display, a cursor control means connected to the display for displacement of a cursor represented on the display; and a user-interface means being coupled to the cursor control means for user-manipulation of the cursor via the cursor control means. In particular, the invention relates to a CD-I system.

BACKGROUND ART

Systems as mentioned in the preamble, among which CD-I systems in particular, are widely known. With the advent of CD-I there has been created a considerably user-friendly medium, which enables interactive handling of information in an ergonomic manner. CD-I systems are particularly, but not exclusively, designed for consumer applications in domestic environments. CD-I applications, e.g., software on compact disc information carriers, are available in a large variety of titles, ranging from video games and reference books to teaching and training applications. User-interface aspects are considered among the key issues that govern the wide acceptance of CD-I. For further information on technical issues, see "Compact Disc-Interactive; A Designer's Overview", Kluwer, November 1988, ISBN 9020121219.

In many program applications, user-interaction with the data processing system is achieved through cursor control. A cursor is a figure, which is displayed on the display screen and whose position can be changed relative to the screen by the user manipulating the user-interface means, e.g., a maneuvering device. The user moves the cursor across the screen as in a video game, or positions the cursor in a particular area shown on the screen, e.g., to select a particular program option as in a menu. The user-interface means may be provided with a maneuvering functionality such as, for example, a plurality of buttons, each for control of the cursor movement in a particular direction, a joy-stick, or a single thumb-controlled button for selective multiple-direction control of the cursor.

OBJECT OF THE INVENTION

The inventors have found that in conventional systems the cursor speed within a single application is some sort of a compromise, i.e., either it is too low for rapidly transferring the cursor over large distances, leading to a tedious behaviour of the system, or too high for accurate positioning, resulting in a rather difficult manipulation of the cursor homing-in on a chosen target.

It is an object of the invention to provide a data processing system of the kind cited in the preamble, in particular a CD-I system, whose cursor positioning control is more user-friendly and whose cursor control means are simply implemented.

SUMMARY OF THE INVENTION

To this end, the invention provides a data processing system being comprised of a display; a cursor control means connected to the display for displacement of a cursor represented on the display; and a user-interface means being coupled to the cursor control means for user-manipulation of the cursor via the cursor control means. In accordance with the invention, the cursor control means is operative to displace the cursor at a relatively low speed relative to the display during a predetermined time interval upon activation of the user-interface means and to displace the cursor at a relatively high speed after the predetermined time interval has elapsed.

The invention is based on the insight that quick and accurate positioning of the cursor is attained in a simple and ergonomic manner by a relatively high-speed approach of the destination area for the cursor, releasing the user-interface and thereupon activating the user-interface again to start the predetermined time interval during which the cursor homes in on the destination area with a relatively low speed.

The user-interface means may be operative to control the cursor control means by transmitting data effecting the relatively low speed to the cursor control means during the predetermined time interval, and by transmitting data effecting the relatively high speed to the cursor control means after the predetermined time interval has elapsed. Alternatively, the cursor control means may be provided with timer means to keep record of the time elapsed for deciding when to change the speed.

Generally, data transmission from the user-interface to the cursor control means involves a temporal basis in terms of repetitive events, called cycles hereinafter. For example, the data processing system may comprise a system clock providing a time basis in terms of clock cycles of fixed length. Alternatively, the aforesaid data transmission may be governed by a protocol whose temporal basis is the repetition of operation cycles, such as cursor position updates. Preferably, the cursor control means is operative to measure the predetermined time interval in terms of a number of the events or cycles. The cursor control means is preferably provided with resettable counting means to count the number of events or cycles elapsed since the user-interface was last activated in order to define the moment of transition from the low-speed domain to the high-speed domain. The counter is reset before another activation of the user-interface occurs.

Typically, each respective one of the repetitive events in a CD-I system involves a transfer of information indicative of an update of a cursor position. In a CD-I system, the data communication between the user-interface and the CD-I player is pre-specified in the RS232-C protocol. The interface typically uses a transmission rate of 1200 baud and 3 bytes per update of the cursor position. Each byte sent to the CD-I player typically has 7 data bits, one start bit and 2 stop bits. Accordingly, the maximum number of pixels that the cursor can traverse per second is 40 times the number of pixels specified per single transmission, and each transmission requires 25 msec. This protocol furnishes a time base governing the interaction rate between the CD-I player and the cursor control means. A predetermined number of transmissions provides a simple standard against which the cursor activation time is measured to determine the predetermined time interval in terms of the number of transmissions.

Preferably, the user-interface means is operative to render at least the relatively low speed or the relatively high speed variable in response to the user manipulating the user-interface. That is, the user has to his disposal a high-speed range and/or a low-speed range.

In one embodiment, a data processing system has a display, a cursor controller connected to the display for displacement of a cursor represented on the display, and a user-interface coupled to the cursor controller. The user-interface is operable to sense a user-desired manipulation of the cursor based on a time period of an application of force on the user-interface by a user. A displacement speed of the cursor as represented by the display is dependent upon the time period of the application of force within the user-interface by the user. Upon an initial application of force within the user-interface by the user, the actual displacement speed of the cursor is continuously variable within a first speed range. Upon a predetermined time interval after the initial application of force within the user-interface by the user, the actual displacement speed of the cursor is continuously variable within a second speed range.

In an embodiment, a data processing system has a display, a cursor controller connected to the display for displacement of a cursor represented on the display, and a user-interface coupled to the cursor controller. The user-interface is operable to sense a user-desired manipulation of the cursor based on a time period of an application of force within the user-interface by a user. During the time period of the application of force within the user-interface by the user, at least one timing signal indicative of the user-desired manipulation of the cursor as sensed by the user-interface is generated. An actual displacement speed of the cursor as represented by the display is continuously variable within a first speed range during a first time period of duration t1. The actual displacement speed of the cursor is continuously variable within a second speed range during a second time period of duration t1–t2.

BRIEF DESCRIPTION OP THE DRAWINGS

Figure 2:
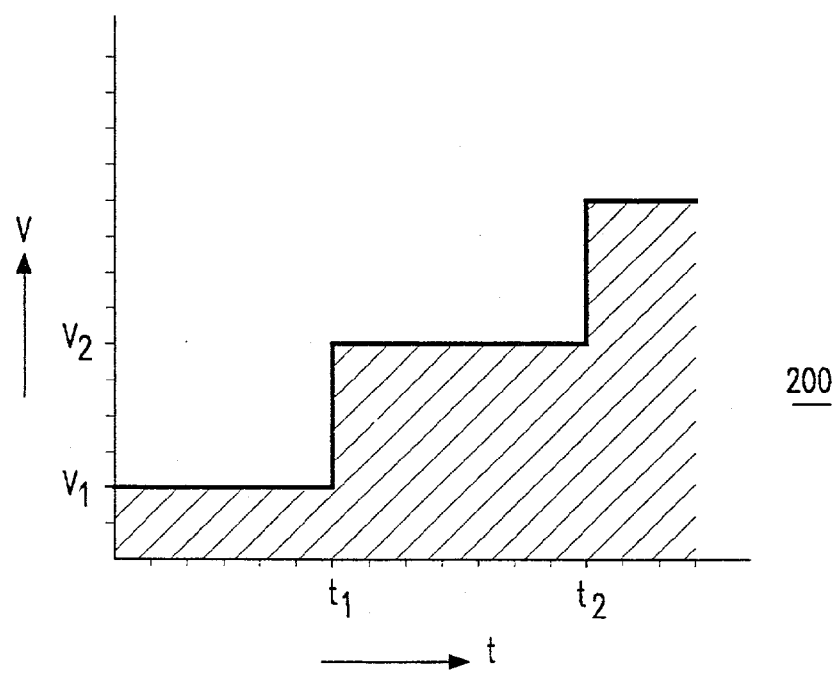
Figure 3:
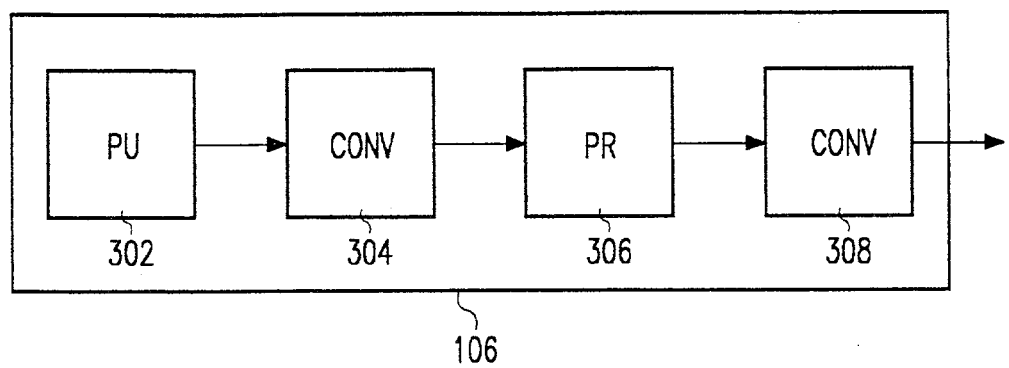
Figure 4:
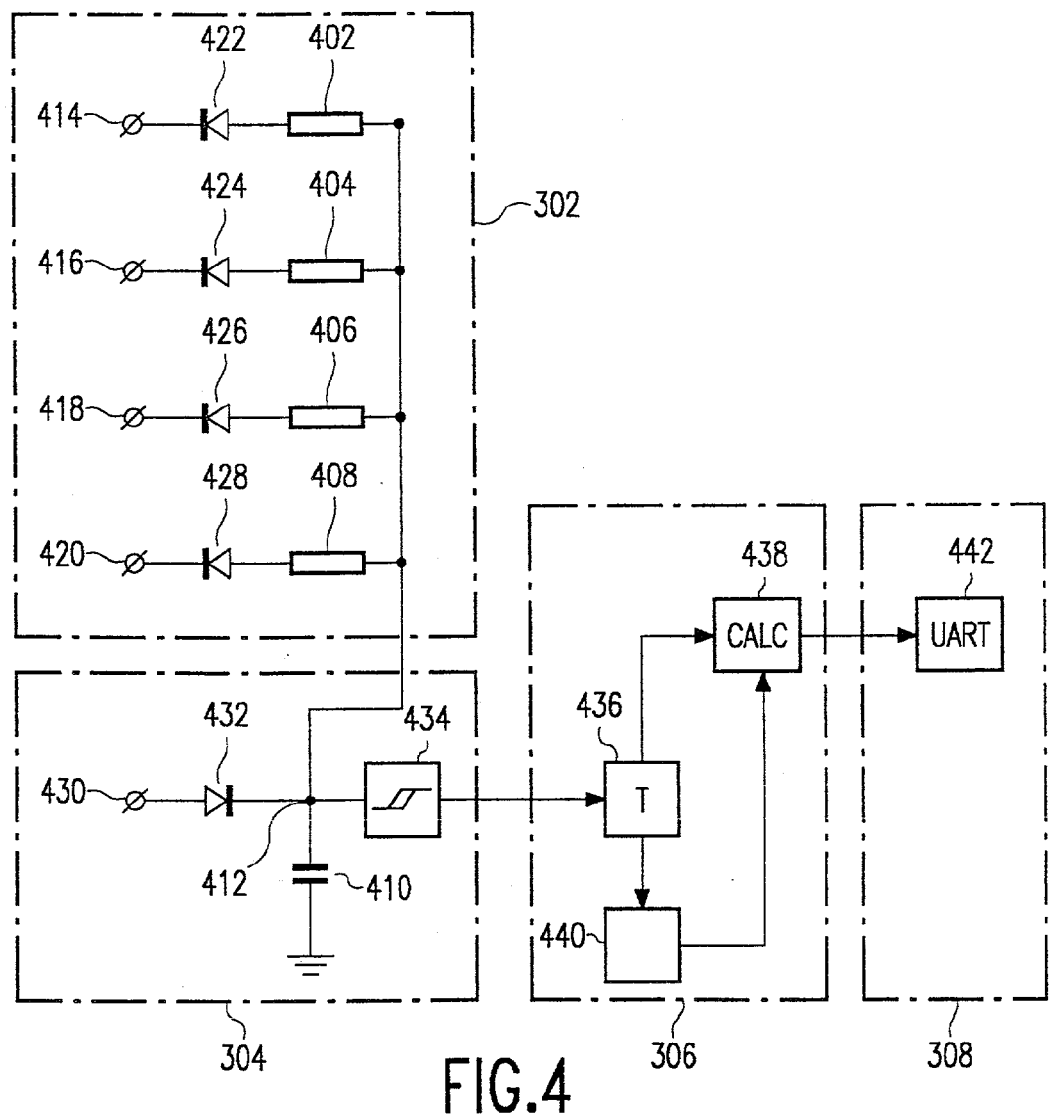

The invention is explained below by way of example and with reference to the accompanying drawing, wherein:

FIG. 1 gives a diagram of the system functionalities in the invention;

FIG. 2 gives a diagram of cursor speed versus time;

FIG. 3 gives a functional diagram of the user-interface means;

FIG. 4 gives an embodiment of the user-interface; and

Figure 5:
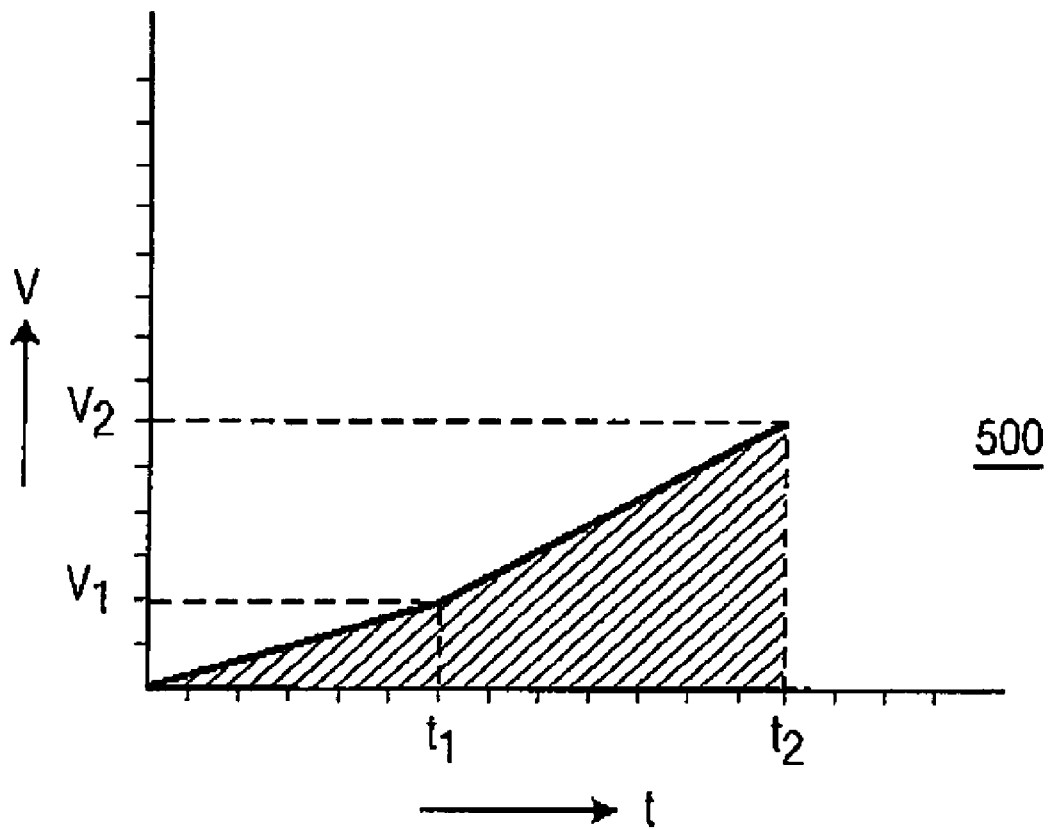

FIG. 5 gives a diagram of cursor speed versus time.

Throughout the figures, same reference numerals indicate identical or corresponding components.

DETAILED DESCRIPTION OF PREFERRED EMBODIMENTS OF THE INVENTION

System

FIG. 1 gives a diagram of a data processing system 100 in the invention. System 100 is functionally comprised of a display 102, a data processing apparatus 104 being operative to generate video or graphics data and being coupled to display 102, and a user-interface means 106 coupled to apparatus 104. User-interface means 106 controls the movement of a cursor 108 on display 102 through a cursor control means 110. Cursor control means 110 here is included in apparatus 104. For example, display 102 is a monitor, apparatus 104 is a CD-I player, and user-interface means 106 is a manually operable data input device, functionally operating as a maneuvering device, e.g., a joy stick. The term "cursor" is meant to comprise any figure shown on the display and to be selectively positioned in a particular area of the display under user-control. Cursor control means 110 usually is dedicated software.

Manual operation of user-interface means 106 generates signals for transmission to cursor control means 110 that thereupon causes cursor 108 to move accordingly. Cursor control means 110 may repetitively interrogate user-interface means 106 to determine the status of the latter for thereupon carrying out the corresponding displacement of cursor 108. Alternatively, user-interface means 106 may directly supervise cursor control means 110 to affect the position of cursor 108.

As explained above, a well adjusted cursor speed is one of the features that renders system 100 user-friendly. Too low a speed of cursor 108 is likely to be found boring, whereas too high a speed will cause overshoots while trying to position cursor 110 at desired location. The invention therefore provides cursor control means 110 with automatic dynamic speed adaptivity. This is explained with reference to FIG. 2.

Speed Diagram

FIG. 2 shows a diagram 200 to explain quantitatively the cursor speed control. Time t is drawn horizontally in, e.g., operation cycles or clock cycles, speed v is drawn in, e.g., pixels/sec. According to the invention, cursor 108 moves at a relatively low speed lower than or equal to v1 during a first time period of duration t1 that starts when user-interface 106 is activated. When the first time period has elapsed, cursor 108 is enabled to move at a relatively high speed lower than or equal to v2, being significantly higher than v1. If desired, the speed of cursor 108 is increased again after a time t2 during which cursor 108 was kept moving at the relatively high speed.

In CD-I systems, a screen of display 102 typically has 720×480 pixels (NTSC mode) or 768×560 pixels (PAL mode). A maximum cursor speed at which cursor 108 is still controllable typically is 400 pixels per second. Slow speed v1 may be in the order of 10 pixels per second. Speed levels v1, v2 and v3.

As mentioned above, the RS232-C protocol typically uses a transmission rate of 1200 baud and 3 bytes per update of the cursor position. Each byte sent to the CD-I player typically has 7 data bits, one start bit and 2 stop bits. Accordingly, the maximum number of pixels that the cursor can traverse per second is 40 times the number of pixels specified per single transmission, and each transmission requires 25 msec. Experiments have shown that a value of time interval t1 in the order of 0.2 seconds is acceptable when the cursor is displaced by one pixel per transmission, i.e., six to eight successive transmissions suffice in practice to accurately position the cursor. Note that the optimum values for speed v1 and time t1 may depend on the individual application run on the CD-I system.

Accurate positioning of cursor 108 now is accomplished in a fairly simple way without being hindered by a too high cursor speed, whereas large distances can be traversed fairly rapidly, all within the same application. In case cursor 108 is to be displaced over a short distance around display 102, low speed v1 and time t1 will do perfectly well to position cursor 108 precisely as desired. In case cursor 108 has to travel a long distance, it will do so initially at a low speed v1 for a time period of duration t1. However, as soon as a time period of t1 has elapsed, the cursor speed is increased to v2 to rapidly traverse a long distance. When approaching the desired position, cursor 108 is to be disabled for just a moment, e.g., by letting loose user-interface 106. Re-activating user-interface 106 then causes cursor 108 to start moving at a low speed v1 again, which is adequate for accurate positioning. When necessary, disabling and subsequent reactivating can be repeated.

The cursor speed may be fixed at values v1 and v2 as for example shown in FIG. 2. Alternatively, v1 and v2 may be the upper bounds of low-speed and high-speed ranges, the cursor speed being continuously variable through user-interface 106 as for example shown in diagram 500 of FIG. 5.

The optimum combinations of speeds v1 and v2 (and v3 and etc.) together with time periods ti (and t1–t2 and etc.) may depend on the application run on system 100. Some applications such as games require a rapid and highly accurate positioning of cursor 108, whereas other applications, such as carrying out a selection through menus, do not need a very precise positioning. Accordingly, cursor speed preferably is made programmable, with regard to magnitude or duration or both. This could be attained by switches or dials to be set by the user. As another option, a special speed selection program could be run on system 100 to let the user select preferred speeds v1 or v2, e.g., Through a menu. Alternatively, cursor speeds could be made to vary automatically under system control depending on the application run on system 100.

User-interface Functionalities

FIG. 3 gives a diagram to explain the successive operations for cursor control to be carried out in the signal path from user-interface 106 to cursor control means 110. FIG. 3 shows user-interface 106 composed of a pick-up means 302; a converter 304 coupled to an output of pick-up means 302; a processor 306 coupled to an output of converter 304; and a converter 308 coupled to an output of processor 306. Pick-up means 302 is operative to sense the manipulation by the user and to provide corresponding output signals. Converter 304 is operative to convert the output signals from pick-up means 302 into appropriately formatted input signals to processor 306. Processor 306 is operative to interpret the output signals from pick-up means 302 as indicative of the desired direction of displacement of cursor 108. Converter 308 is optional and is meant to convert the output signals of processor 306 into an appropriate format accepted by apparatus 104. Converter 308 can also be functionally integrated with processor 306.

User-interface Embodiment

FIG. 4 shows an example of an embodiment of user-interface means 106. Pick-up means 302 is comprised of force sensing resistors 402, 404, 406 and 408 for control of the movement of cursor 108 to the left, to the right, up and down, respectively. A force sensing resistor is, for example, a polymer thick film resistor such as FSR of Interlink. Such a resistor has a resistance that decreases with increasing pressure applied to the film. Typically, the resistance value is inversely proportional to the applied force in the range between 15 gram to 10 kg and swings about 100 k$\Omega$.

The actual resistance values of resistors 402–408 are to be converted into digital data. This can be achieved in a variety of manners, e.g., by way of an A/D conversion, by way of an oscillator or a VCO of which the resistor is a functional part and digitally measuring the frequency or the VCO's control signal, or via an RC-arrangement to measure the varying charging or discharging time of the capacitor C through a counting circuit. The RC option turns out to be a cheap and simple solution and is implemented as follows.

Resistors 402, 404, 406 and 408 all are connected to a capacitor 410 via a node 412. Resistors 402, 404, 406 and 408 are individually coupled to control inputs 414, 416, 418 and 420, respectively, via diodes 422, 424, 426 and 428, respectively. Node 412 is further coupled to a charge control input 430 via a diode 432. Setting control inputs 414, 416, 418, 420 and 430 at 5 volt, e.g. through processor 306, causes capacitor 410 to be charged. Setting control inputs 416, 418 and 420 at 5 volts and control inputs 414 and 430 at 0 volt, e.g., through processor 306, causes capacitor 410 to be discharged via resistor 402. The voltage level at node 412 decreases exponentially with characteristic RC time, R being the instant resistance of resistor 402, C being the capacitance of capacitor 410. Node 412 is connected to a Schmitt trigger 434 that provides an output signal of well defined voltage level, and also functions as a buffer with small input impedance so as not to affect the voltage at node 412 too severely. Schmitt trigger 434 supplies its output signal to a timer 436 in processor 306. Timer 436 stops counting when Schmitt trigger 434 switches over due to the voltage at node 412 being dropped below a particular level. The contents of timer 436 then is representative of the resistance value of resistor 402 and, therefore, of the force experienced by resistor 402.

This timer contents now can be translated by a calculation means 438 of processor 306 into a quantity associated with a magnitude of the speed of cursor 108 in the direction associated with resistor 402, which is to the left. Consecutively interrogating resistors 402–408 generates consecutive timer contents that are combined in calculation means 438 to produce a particular speed and a particular direction. For example, the difference between the up and down related timer contents corresponds to a vertical component of the cursor speed, whereas the difference between the left and right related timer contents corresponds to the horizontal component of the cursor speed. These components then can be combined to generate a proper velocity vector on a pixel grid of display 102 in a conventional manner. Calculation means 438 could be implemented, for example, by a simple look-up table. , Typically, the maximum voltage at node 412 is 4.3 volt as the voltage drop across diodes 422–428 is 0.7 volt. Schmitt trigger 434 has a typical switch-over point of 0.8 volt. Typically, the maximum time allowed to discharge is 300 $\mu$sec, and the minimum time is 1 $\mu$sec. The capacitance of capacitor 410 is typically 2.2 $\mu$f.

Cursor speed range control as proposed in the invention is accomplished as follows. In a first step, the resistance values of resistors 402–408 are measured as specified above while user-interface 106 is manipulated. In a next, second step, these measured resistance values are reduced in processor 306 to cursor displacement quantities in the appropriate format accepted by apparatus 104. In a next, third step, the displacement quantities are transmitted to apparatus 104. These steps are normally cyclically repeated while user-interface 106 is kept actuated. Processor 306 is provided with a counter 440 to register up to a pre-specified number of aforesaid first steps that were carried out since user-interface 106 was last actuated. Before counter 440 reaches the pre-specified number, calculation means 438 is made to furnish low-speed data. When counter 440 has counted the pre-specified number, calculation means 438 is controlled to provide high-speed data.

User-interface means 106 is provided with a Universal Asynchronous Receiver and Transmitter 442 (UART) for serial RS232 communication of the data pertaining to cursor speed and direction, mentioned above as the accepted protocol in CD-I. Alternatively, processor 306 may have an UART 442 aboard such as the 8051-based 8-bit microcontrollers of Philips.

We claim:

1. A data processing system, comprising:
   a display;
   a cursor controller connected to said display for displacement of a cursor represented on said display; and
   a user-interface coupled to said cursor controller, said user-interface operable to sense a user-desired manipulation of the cursor based on a time period of an application of force on said user-interface by a user,
      wherein a displacement speed of the cursor as represented by said display is dependent upon the time period of the application of force on said user-interface by the user,
      wherein, upon an initial application of force on said user-interface by the user, the actual displacement speed of the cursor is variable within a first speed range, and
      wherein, upon a predetermined time interval after the initial application of force on said user-interface by the user, the actual displacement speed of the cursor is variable within a second speed range.

2. The data processing system of claim 1,
   wherein, during the time period of the application of force on said user-interface by the user, at least one timing signal indicative of a sensing of the user-desired manipulation of the cursor is generated;
   wherein the actual displacement speed of the cursor is within the first speed range when a total generation of timing signals is less than a pre-specified number; and
   wherein the actual displacement speed of the cursor is within the second speed range when the total generation of timing signals is equal to or greater than the pre-specified number.

3. The data processing system of claim 2, wherein the at least one timing signal includes at least one vertical timing signal indicative of a vertical speed component of the user-desired manipulation of the cursor.

4. The data processing system of claim 2, wherein the at least one timing signal includes at least one horizontal signal indicative of a horizontal speed component of the user-desired manipulation of the cursor.

5. The data processing system of claim 1, wherein, during the activation of said user-interface, said user-interface includes:
   means for generating at least one timing signal indicative of the user-desired manipulation of the cursor; and
   means for counting a total generation of timing signals.

6. The data processing system of claim 5,
   wherein the actual displacement speed of the cursor is within the first speed range when the total generation of timing signals is less than a pre-specified number; and
   wherein the actual displacement speed of the cursor is within the second speed range when the total generation of timing signals is equal to or greater than the pre-specified number.

7. A data processing system, comprising:
   a display;
   a cursor controller connected to said display for displacement of a cursor represented on said display; and
   a user-interface coupled to said cursor controller, said user-interface operable to sense a user-desired manipulation of the cursor based on a time period of an application of force on said user-interface by a user,
      wherein, during the time period of the application of force on said user-interface by the user,
         at least one timing signal indicative of the user-desired manipulation of the cursor as sensed by said user-interface is generated,
         an actual displacement speed of the cursor as represented by said display is variable within a first speed range when a total generation of timing signals is less than a pre-specified number, and
         the actual displacement speed of the cursor is variable within a second speed range when the total generation of timing signals is equal to or greater than the pre-specified number.

8. The data processing system of claim 7, wherein the pre-specified number defines a predetermined time interval during the activation of said user-interface.

9. The data processing system of claim 7, wherein the at least one timing signal includes at least one vertical timing signal indicative of a vertical speed component of the user-desired manipulation of the cursor.

10. The data processing system of claim 7, wherein the at least one timing signal includes at least one horizontal signal indicative of a horizontal speed component of the user-desired manipulation of the cursor.

* * * * *